(12) United States Patent
Ona et al.

(10) Patent No.: US 6,416,558 B1
(45) Date of Patent: Jul. 9, 2002

(54) WATER BASED FIBER TREATMENT AGENT AND METHOD FOR TREATING FIBERS

(75) Inventors: Isao Ona; Hiroki Ishikawa; Tsutomu Naganawa; Kazuo Kobayashi; Yoshitsugu Morita, all of Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 0 days.

(21) Appl. No.: 09/566,306

(22) Filed: May 8, 2000

(30) Foreign Application Priority Data

May 24, 1999 (JP) ............................................. 11-143695

(51) Int. Cl.$^7$ ................................................ C08T 25/00
(52) U.S. Cl. ........................ 8/115.51; 8/115.6; 8/116.1; 524/837; 524/860; 524/861; 524/862
(58) Field of Search .......................... 8/115.51, 115.6, 8/116.1; 524/837, 860, 861, 862

(56) References Cited

U.S. PATENT DOCUMENTS

| 4,891,398 A | | 1/1990 | Tanaka et al. | ............... 524/188 |
|---|---|---|---|---|
| 5,064,894 A | * | 11/1991 | Desmonceau et al. | ...... 524/503 |
| 5,232,611 A | | 8/1993 | Ohashi et al. | ............... 252/8.6 |
| 6,071,987 A | * | 6/2000 | Matsumoto et al. | ........ 523/209 |

FOREIGN PATENT DOCUMENTS

| EP | 0989226 A2 | 3/2000 | ........ D06M/15/643 |
|---|---|---|---|
| JP | 78-106305 | 3/1980 | |
| JP | 04-198321 | 7/1992 | |

* cited by examiner

Primary Examiner—Yogendra N. Gupta
Assistant Examiner—Derrick Hamlin
(74) Attorney, Agent, or Firm—Jim L. De Cesare

(57) ABSTRACT

A water based fiber treatment agent and fiber treatment method impart to treated fibers a perfect smoothness, lubricity, reduced tackiness, and pleasant tactile sensations. The water based fiber treatment agent contains a silicone oil emulsion of crosslinked silicone particles with an average diameter of 0.01 to 100 $\mu$m which are in silicone oil drops having an average diameter of 0.05 to 500 $\mu$m, and then the silicone oil drops are dispersed in water. The diameter of the crosslinked silicone particles is smaller than the diameter of the silicone oil drops.

1 Claim, No Drawings

WATER BASED FIBER TREATMENT AGENT AND METHOD FOR TREATING FIBERS

CROSS-REFERENCE TO RELATED APPLICATIONS

Not applicable.

STATEMENT REGARDING FEDERALLY SPONSORED RESEARCH OR DEVELOPMENT

Not applicable. REFERENCE TO A MICROFICHE APPENDIX

Not applicable.

FIELD OF THE INVENTION

This invention is directed to a water based fiber treatment agent and method for treating fibers. In particular, the water based fiber treatment agent can impart to fibers either perfect smoothness, lubricating properties, reduced tackiness, or pleasant tactile sensation. The invention is also directed to methods of treating fibers to impart to the fibers perfect smoothness, lubricating properties, reduced tackiness, or pleasant tactile sensation.

BACKGROUND OF THE INVENTION

Water based fiber treatment agents composed of silicone oil emulsions are disclosed in Japanese Laid Open Patent Applications [Kokai] Sho 55-34228 and Hei 4-198321. Furthermore, [Kokai] Sho 64-45466/U.S. Pat. No. 4,891,398 (Jan. 2, 1990) and [Kokai] Hei 3-152275/U.S. Pat. No. 5,232,611 (Aug. 3, 1993) each disclose water based fiber treatment agents in which such an emulsion is combined with a polyorganosilsesquioxane powder.

However, these water based fiber treatment agents either cannot impart to fibers sufficient smoothness, lubricating, and adhesion prevention properties, or they have low stability.

BRIEF SUMMARY OF THE INVENTION

It is therefore an object of the invention to provide water based fiber treatment agents which impart to fibers a perfect smoothness, lubricating properties, reduced tackiness, or pleasant tactile sensation. Another object is to provide methods of treating fibers to impart to the fibers perfect smoothness, lubricating properties, reduced tackiness, or pleasant tactile sensation.

These and other features of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

The water based fiber treatment agent of this invention is characterized by being made from a silicone oil emulsion of crosslinked silicone particles with an average diameter of 0.01 to 100 μm which are in silicone oil drops with an average diameter of 0.05 to 500 μm, which are in turn dispersed in water. The diameter of the crosslinked silicone particles is smaller than the diameter of the silicone oil drops.

The method of the invention for treating fibers is characterized in that the fibers are treated with a water based fiber treatment agent made of a silicone oil emulsion of crosslinked silicone particles with an average diameter of 0.01 to 100 μm in silicone oil drops having an average diameter of 0.05 to 500 μm, which are dispersed in water. Again, the diameter of the crosslinked silicone particles is smaller than the diameter of the silicone oil drops.

Following is a more detailed description of the silicone oil emulsion of the present invention. Thus, the treatment agent of the invention is characterized by comprising a silicone oil emulsion that contains crosslinked silicone particles in silicone oil drops which are then dispersed in water. The crosslinked silicone particles contained in the emulsion are obtained by crosslinking a crosslinkable silicone composition.

This composition can be prepared by causing a hydrosilation crosslinking reaction, a condensation crosslinking reaction, an organic peroxide type crosslinking reaction, or a high energy ray crosslinking reaction. The most preferable reactions are hydrosilation crosslinking reactions or condensation crosslinking reactions.

There are no special limitations relative to the type of silicone oil used for forming the silicone oil drops, but the silicone oil preferably should have a completely linear, partially branched linear, cyclic, or branched chain molecular structure. The most preferable structure is a linear molecular structure. It is preferred that a silicone oil be used which does not participate in the crosslinking reaction during formation of the crosslinked silicone particles.

Thus, the silicone oil should not participate in the reaction or be obstructive to the reaction. For example, where the crosslinked silicone particles are formed by a hydrosilation crosslinking reaction, the silicone oil should be a silicone oil which does not contain in its molecules any alkenyl groups and silicon bonded hydrogen atoms. In this regard, the silicone oil can be a dimethylpolysiloxane having both molecular terminals capped with trimethylsiloxy groups, a methylphenylpolysiloxane having both molecular terminals capped with trimethylsiloxy groups, a copolymer of methylphenylsiloxane and dimethylsiloxane having both molecular terminals capped with trimethylsiloxy groups, a copolymer of methyl-(3,3,3-trifluoropropyl)-siloxane and dimethylsiloxane having both molecular terminals capped with trimethylsiloxy groups, a cyclic dimethylpolysiloxane, or a cyclic methylphenylsiloxane.

Among these silicone oils, part of the hydrogen atoms in any hydrocarbon group in a side chains and on a molecular terminal can be substituted by polyether groups, carboxyl groups, or epoxy groups. When the crosslinked silicone particles are formed by means of a condensation crosslinking reaction, the silicone oil can be a compound which does not contain in its molecule silanol groups, silicon bonded hydrogen atoms, or silicon bonded hydrolyzable groups. Representative silicone oils are dimethylpolysiloxanes having both molecular terminals capped with trimethylsiloxy groups, methylphenylpolysiloxanes having both molecular terminals capped with trimethylsiloxy groups, copolymers of methylphenylsiloxane and dimethylsiloxane having both molecular terminals capped with trimethylsiloxy groups, copolymers of methyl-(3,3,3-trifluoropropyl)-siloxane and dimethylsiloxane having both molecular terminals capped with trimethylsiloxy groups, cyclic dimethylpolysiloxanes, cyclic methylphenylsiloxanes, dimethylpolysiloxanes having both molecular terminals capped with dimethylvinylsiloxy groups, copolymers of methylvinylsiloxane and dimethylsiloxane having both molecular terminals capped with dimethylvinylsiloxy groups, methylvinylpolysiloxanes having both molecular terminals capped with trimethylsiloxy groups, or cyclic methylvinylsiloxanes. Again, some of the hydrogen atoms in hydrocarbon groups on the molecular terminals and in the side chains of these types of silicone oils can be substituted by amino groups, amide groups, epoxy groups, carboxyl groups, or polyether groups.

Although there are no special limitations with regard to the viscosity of these silicone oils, it is preferred that the viscosity be within the range of 1 to 100,000,000 mPa·s at 25° C., most preferably 5 to 10,000,000 mPa·s, at 25° C.

It is, however, necessary that the average diameter of silicone oil drops in the emulsion be within a range of 0.05 to 500 μm, and preferably within a range of 0.05 to 200 μm. This is for the reason that an average diameter of silicone oil drops below the lower limit or above the upper limit of this range causes the water based fiber treatment agent to lose its stability.

It is also necessary that the average diameter of crosslinked silicone particles in the emulsion be within a range of 0.01 to 100 μm, and preferably within a range of 0.05 to 50 μm. This is for the reason that emulsions with an average diameter of crosslinked silicone particles below the lower limit or above the upper limit of this range possess low stability.

In addition, and as should be apparent, in emulsions of this invention the diameter of the crosslinked silicone particles should be smaller than the diameter of the silicone oil drops.

The crosslinked silicone particles may have a spherical, thread like, flat, or an irregular shape. A spherical shape is preferred. Furthermore, irrespective of the characteristics of the crosslinked silicone particles, the emulsion can be obtained in a gel like, rubber like, or similar elastomeric form.

Silicone oil emulsions of the invention can be prepared by a number of different methods. According to a first method, crosslinked silicone particles are preliminarily uniformly dispersed in a silicone oil, and then mixture is emulsified in water.

According to a second method, a silicone oil emulsion can be obtained by preliminarily emulsifying a silicone oil in water which is then mixed with a crosslinked silicone particle suspension obtained by preliminarily emulsifying crosslinked silicone particles in water.

However, in the first method, the crosslinked silicone particles cannot be uniformly dispersed in the silicone oil, so it is difficult to prepare a silicone oil emulsion that would contain crosslinked silicone particles in silicone oil drops dispersed in water.

On the other hand, in the second method, the crosslinked silicone particles and silicone oil drops are dispersed independently, it is difficult to prepare a specific silicone oil emulsion which would contain crosslinked silicone particles in silicone oil drops dispersed in water.

For these reasons, it is most preferred to prepare the silicone oil emulsion by dispersing in water, a crosslinkable silicone composition which contains a non-crosslinkable silicone oil, and then conducting the crosslinking reaction. It should be understood that the non-crosslinkable silicone oil should be used in an amount that exceeds the amount of non-crosslinkable silicone oil that can be held in the crosslinked product obtained from the crosslinkable silicone composition.

The crosslinkable silicone composition can be of a type that produces as a result of crosslinking, a crosslinked product in the form of a gel, rubber, or similar elastomer. For example, it can be the result of a hydrosilation crosslinking type reaction, a condensation crosslinking type reaction, an organic peroxide crosslinking type reaction, or a high energy ray crosslinking type reaction. The most preferable types of reactions are hydrosilation crosslinking reactions and condensation crosslinking reactions.

The hydrosilation crosslinking reaction silicone composition comprises at least an organopolysiloxane having in its molecule at least two alkenyl groups, an organopolysiloxane having in its molecule at least two silicon bonded hydrogen atoms, and a catalyst for the hydrosilation reaction.

Alkenyl groups in the first mentioned organopolysiloxane can be represented by vinyl groups, allyl groups, butenyl groups, pentenyl groups, and hexenyl groups. Most preferred are vinyl groups. This organopolysiloxane can also contain monovalent hydrocarbon groups other than alkenyl groups bonded to silicon atoms such as methyl groups, ethyl groups, propyl groups, butyl groups, or other similar alkyl groups; cyclopentyl groups, cyclohexyl groups, or other similar cycloalkyl groups; phenyl groups, tolyl groups, xylyl groups, or other similar aryl group; benzyl groups, phenethyl groups, 3-phenylpropyl groups, or other similar aralkyl groups; and 3-chloropropyl groups, 3,3,3-trifluoropropyl groups, or other similar halogenated hydrocarbon groups. This organopolysiloxane groups may have a linear, cyclic, network like, or partially branched linear molecular structure. In order to form elastomer like crosslinked silicone particles such as gel or rubber like particles, linear and partially branched linear structures are most preferred. While there are no special limitations with regard to the viscosity of the first mentioned organopolysiloxane, it should have a viscosity that does not limit dispersing of the crosslinkable silicone composition in water. Therefore, it is preferable that the viscosity be within a range of 20 to 100,000 mPa·s, preferably between 20 and 10,000 mPa·s at 25° C.

The examples of silicon bonded groups other than silicon bonded hydrogen atoms present in the second mentioned organopolysiloxane are the same as the monovalent hydrocarbon groups noted above in the first mentioned organopolysiloxane. The second mentioned organopolysiloxane may have a linear, cyclic, network like, or partially branched linear molecular structure. Again, although there are no special limitations with regard to the viscosity of the second mentioned organopolysiloxane, it should be one that does not limit dispersing the crosslinkable silicone composition in water. Preferably, its viscosity should be within a range of 1 to 10,000 mPa·s at 25° C.

It is preferred that the second mentioned organopolysiloxane be used in the crosslinkable silicone composition in an amount sufficient for curing the composition, but preferably in an amount of 0.3 to 200 parts by weight based upon 100 parts by weight of the first mentioned organopolysiloxane.

The hydrosilation reaction catalyst contained in the crosslinkable silicone composition is any catalyst for accelerating crosslinking. A platinum catalyst is preferred. Some examples of platinum catalyst are chloroplatinic acid, an alcohol solution of chloroplatinic acid, an olefin complex of platinum, an alkenylsiloxane complex of platinum, platinum black, or a platinum catalyst on a silica carrier.

In manufacturing products using the method of the present invention, a crosslinkable silicone composition that contains a hydrosilation catalyst in water can be prepared by (i) dispersing in water, a crosslinkable silicone composition which has been premixed with an hydrosilation catalyst, or (ii) a crosslinkable silicone composition can be dispersed in water without the catalyst, and then the catalyst can be added to water. In either case, it is preferred that the aqueous dispersion contain a hydrosilation catalyst with an average particle diameter not exceeding 1 μm.

The hydrosilation catalyst should be present as a component of the crosslinkable composition in an amount sufficient for accelerating the crosslinking of the crosslinkable composition. For example, in the case of platinum based systems, the catalyst should be used in an amount to provide $1 \times 10^{-7}$ to $1 \times 10^{-3}$ parts by weight of platinum metal based upon 100 parts by weight of the composition.

The condensation crosslinking reaction type silicone composition comprises an organopolysiloxane which contains a hydrolyzable group such as an aminoxy group, an acetoxy group, an oxime group, an alkoxy group, or hydroxyl group, bonded to at least two silicon atoms in its molecule; a silane type crosslinking agent having a hydrolyzable group such as an aminoxy group, an acetoxy group, an oxime group, or an alkoxy group, bonded to at least three silicon atoms in its molecule; and a condensation reaction catalyst such as an organic titanium compound or an organic tin compound.

In this organopolysiloxane, the alkoxy groups can be represented by methoxy groups, ethoxy groups, and methoxyethoxy groups; and the oxime groups can be represented by dimethylketoxime groups and methylethylketoxime groups. Other groups can be bonded to silicon atoms in the organopolysiloxane such as monovalent hydrocarbon groups represented by methyl groups, ethyl groups, propyl groups, butyl groups, or similar type alkyl groups; cyclopentyl groups, cyclohexyl groups, or similar type cycloalkyl groups; vinyl groups, allyl groups, butenyl groups, pentenyl groups, hexenyl groups; phenyl groups, tolyl groups, xylyl groups, or similar type aryl groups; benzyl groups, phenethyl groups, 3-phenylpropyl groups, or similar type aralkyl groups; 3-chloropropyl groups, 3,3,3-trifluoropropyl groups, or similar halogenated hydrocarbon type groups. This organopolysiloxane may have a linear, cyclic, network like, or partially branched linear molecular structure. Linear or partially branched linear molecular structures are preferred for forming gel like and rubber like elastomer type crosslinked silicone particles.

Although there are no special limitations with regard to the viscosity of the organopolysiloxane, it should not limit the dispersing of the crosslinkable silicone composition in water. Therefore, it is preferably a viscosity within the range of 20 to 100,000 mPa·s, preferably between 20 and 10,000 mPa·s at 25° C.

The oxime groups and the alkoxy groups in the silane type crosslinking agent can be the same as those noted above. The silane type crosslinking agent can be represented by methyltrimethoxysilane, vinyltrimethoxysilane, methyltrioximosilane, and vinyltrioximosilane. It is preferred that the silane type crosslinking agent be used in an amount sufficient for curing the crosslinkable silicone composition, and preferably that it be present in an amount of 0.3 to 200 parts by weight based upon 100 parts by weight of the organopolysiloxane composition.

Condensation reaction catalysts such as organic tin compounds and organic titanium compounds are intended for accelerating the crosslinking reaction of the crosslinkable silicone compound. Such catalysts can be represented by dibutyltin dilaurate, dibutyltin diacetate, tin octoate, dibutyltin dioctoate, tin laurate, tetrabutyl titanate, tetrapropyl titanate, and dibutoxy bis(ethylacetoacetate) titanate.

The condensation reaction catalyst should be used in an amount sufficient to crosslink the crosslinkable silicone composition, and preferably in an amount of 0.01 to 5 parts by weight, more preferably 0.05 to 2 parts by weight, based respectively upon 100 parts by weight of the organopolysiloxane composition.

If desired, a filler can be added to the crosslinkable silicone composition for adjusting its flowability or for improving the mechanical strength of the resulting crosslinked silicone particles. Some examples of suitable fillers are precipitated silica, fumed silica, baked silica, fumed titanium oxide, or similar reinforcing filler; crushed quartz, diatomaceous earth, aluminosilicic acid, ferrous oxide, zinc oxide, calcium carbonate, or similar nonreinforcing filler. The surfaces of these types of fillers can be treated with hexamethyldisilazane, trimethylchlorosilane, a polydimethylsiloxane, a polymethylhydridosiloxane, or a similar organosilicon compound.

The non-crosslinkable silicone oil that is contained in the crosslinkable silicone composition should be one which does not make any contribution to the reaction of crosslinking of the composition itself. Although there are no special limitations with regard to viscosity, the viscosity should be one which will ensure the dispersion in water of the crosslinkable silicone composition containing the non-crosslinkable silicone oil. Preferably therefore, the non-crosslinkable silicone oil should have a viscosity of 1 to 100,000,000 mPa·s, preferably between 2 and 10,000,000 mPa·s, at 25° C. In addition, the non-crosslinkable silicone oil may be an organopolysiloxane having a linear, partially branched linear, cyclic, or branched molecular structure. Linear and cyclic molecular structures are the most preferred.

When the crosslinkable silicone composition is an hydrosilation crosslinking reaction type, it is preferred that the non-crosslinkable silicone oil contain no alkenyl groups or silicon bonded hydrogen atoms in its molecule. Some suitable examples of such oils are dimethylpolysiloxanes having both molecular terminals capped with trimethylsiloxy groups, methylphenylpolysiloxanes having both molecular terminals capped with trimethylsiloxy groups, copolymers of methylphenylsiloxane and dimethylsiloxane having trimethylsiloxy groups on both molecular terminals, copolymers of methyl-(3,3,3-trifluoropropyl) siloxane and dimethylsiloxane having trimethylsiloxy groups on both molecular terminals, cyclic dimethylpolysiloxanes, and cyclic methylphenylsiloxanes. A portion of the side chains and/or the hydrogen atoms in terminal hydrocarbon groups in these molecules can be substituted with epoxy groups, carboxy groups, or polyether groups.

For the crosslinkable silicone which is a condensation crosslinking reaction type, it is preferred that the non-crosslinkable silicone oil not contain silanol groups, silicon bonded hydrogen atoms, or silicon bonded hydrolyzable groups in its molecule. Examples of appropriate silicone oils are dimethylpolysiloxanes having both molecular terminals capped with trimethylsiloxy groups, methylphenylpolysiloxanes having both of molecular terminals capped with trimethylsiloxy groups, copolymers of methylphenylsiloxane and dimethylsiloxane having trimethylsiloxy groups on both molecular terminals, copolymers of methyl-(3,3,3-trifluoropropyl)-siloxane and dimethylsiloxane having trimethylsiloxy groups on both molecular terminals, cyclic dimethylpolysiloxanes, cyclic methylphenylsiloxanes, dimethylpolysiloxanes having both molecular terminals capped with dimethylvinylsiloxy groups, copolymers of methylvinylsiloxane and dimethylsiloxane having both molecular terminals capped with dimethylvinylsiloxy groups, methylvinylpolysiloxanes having both molecular terminals capped with trimethylsiloxy groups, and cyclic methylvinylsiloxanes. Part of the side chains or the hydrogen atoms in any terminal hydrocarbon groups in these molecules of silicone oil can, if desired, be substituted by amino groups, amide groups, epoxy groups, carboxy groups, and polyether groups.

The non-crosslinkable silicone oil contained in the crosslinkable compound should be used in an amount sufficient for maintaining the non-crosslinkable silicone oil in the product of the crosslinking of the crosslinkable silicone composition. In particular, it should be used in excess of the quantity of the non-crosslinkable oil that can be held by the product of the crosslinking. The amount that can be held is different for each combination of crosslinkable silicone composition and non-crosslinkable silicone oil. In general, however, the non-crosslinkable silicone oil should be used in an amount within the range of 200 to 5,000 parts by weight, preferably 250 to 2,000 parts by weight, based upon 100 parts by weight of crosslinkable silicone composition.

The method for preparing emulsions according to the may consist of dispersing a crosslinkable silicone composition that contains the non-crosslinkable silicone oil in water, and then conducting the crosslinking reaction. Dispersing the crosslinkable silicone composition in water can be carried out using a homomixer, a paddle mixer, an Henschel mixer, a homodisperser, a colloid mixer, a propeller type stirrer, an homogenizer, an inline type continuous emulsifier, an ultrasound emulsifier, or a vacuum kneader.

Water should be used in an amount of 5 to 99 weight percent, preferably 10 to 80 weight percent based upon the total weight of the emulsion. To improve stability of the crosslinkable silicone composition in water, and to ensure dispersion, the composition may be combined with a non-ionic surface active agent, a cationic surface active agent, or an anionic surface active agent. Nonionic surface active agents are preferred. The surface active agent should be used in an amount of 0.1 to 20 parts by weight, preferably 0.5 to 10 parts by weight, based upon 100 parts by weight of the crosslinkable silicone composition containing the non-crosslinkable silicone oil.

The emulsion of the crosslinkable silicone composition is then either heated, maintained at room temperature, or irradiated with high energy rays, whereby the crosslinking reaction is caused to occur in the crosslinkable silicone composition dispersed in water.

Treatment agents according to this invention may contain other components such as liquid paraffin, magnesium stearate, calcium stearate, or similar organic oils and lubricants. In addition, there can be included antistatic agents, charge suppressing agents, bactericidal agents, preservative agents, and anticorrosive agents.

These treatment agents can be used as oils for application to raw yarn, raw cotton, stuffing, wool blends, nylon staple fibers, acrylic staple fibers, and in knitting, spinning, as well as for application to sewing threads or spandex urethane elastic yarns, to impart smoothness and lubricity. They can also be used for rayon, regenerated fibers, acetate fibers, semiregenerated fibers, polyester fibers, or other synthetic fiber.

When the silicone oil contains epoxy or carboxyl groups, the treatment agent can be used as a napping agent for raised fabrics; a hand improver for enhancing softness, smoothness, compression recovery, antiwrinkling properties, and stretch recovery; a finishing agent for deep coloring and heavy dyeing of polyester fabrics; an antimelting finishing agent for sportswear; or as a tack improver in a waterproofing agent to impart water repellency. When the silicone oil contains polyether groups and is used as a treating agent, a stable treatment agent can be obtained even when another surfactant is not added.

The method for treating fibers according to the invention is characterized in that fibers are treated with a water based fiber treatment agent. Treatments using water based fiber treatment agents can be carried out in a number of ways, one example of which is a method in which the water based fiber treatment agent is diluted with water or used without being diluted, and applied to a cloth, yarn, cotton, or tow, by spraying, by a kiss roll, or by gravure printing, and then dried or heat treated.

Generally, the water based fiber treatment agent should be applied to the fiber such that the combined amount of the crosslinked silicone particles and the silicone oil, i.e., the add-on solids in the water based fiber treatment agent, be between 0.01 and 8 weight percent. In the case of polyester, nylon, or other raw yarn or raw cotton, the amount should be between 0.2 and 1.0 weight percent. When the object of the treatment is to improve hand of a textile fabric made from cotton or blends of polyester and cotton, the amount should be between 0.3 and 1.0 weight percent. For sewing thread or spandex yarn in particular, the amount should be between 3 and 10 weight percent.

EXAMPLES

The following examples are set forth in order to illustrate the invention in more detail. The viscosity used in the examples is the value obtained at 25° C. unless otherwise indicated. The average diameter of the silicone oil droplets, and the average diameter of the crosslinked silicone particles in the silicone oil emulsion, used as the water based fiber treatment agent, were determined as follows.

Average Diameter of Silicone Oil Droplets in the Silicone Oil Emulsion

The silicone oil emulsion was measured by means of a laser diffraction type particle distribution gauge, Model LA-500, which is a product manufactured by Horiba. A median diameter of the silicone oil droplets was obtained, i.e., a diameter corresponding to 50 percent of the cumulative distribution, and is used hereafter as the average diameter.

Average Diameter of Crosslinked Silicone Particles in Silicone Oil Emulsion

The silicone oil emulsion was air dried on a glass sheet to remove the water, the crosslinked silicone particles dispersed in the silicone oil were then collected, observed under an electron microscope, and the average of 10 particle diameters is used hereafter as the average diameter.

Reference Example 1

A silicone composition was prepared by mixing 18.8 parts by weight of a dimethylpolysiloxane having a viscosity of 400 mPa·s and having dimethylvinylsiloxy groups on both molecular terminals; 1.2 parts by weight of a 30 mPa·s viscosity copolymer of methylhydridosiloxane and dimethylsiloxane having trimethylsiloxy groups on both molecular terminals and containing 0.5 weight percent silicon bonded hydrogen; and 80 parts by weight of a 1,000 mPa·s viscosity dimethylpolysiloxane having trimethylsiloxy groups on both molecular terminals. This crosslinkable silicone composition was then combined with 53 parts by weight of a 3 percent by weight aqueous solution of polyoxyethylene nonylphenylether, a nonionic surfactant having an HLB of 13.1. After emulsification, 50 parts by weight of pure water were added to the mixture. This resulted in an aqueous emulsion of the silicone composition.

A separately prepared aqueous emulsion of platinum catalyst comprising a complex of platinum and 1,3-divinyl-1,1,3,3-tetramethyldisiloxane in which the average diameter of platinum particles was 0.05 μm and the concentration of metallic platinum was 0.05 percent by weight, was added to the aqueous emulsion of the silicone composition prepared above. These components were uniformly mixed so that the content of metallic platinum in weight units was 20 ppm. An aqueous emulsion of a crosslinkable silicone composition was thus obtained.

This emulsion was kept intact at room temperature for one day, and then this crosslinkable silicone composition was subjected to a hydrosilation crosslinking reaction. As a result, a silicone oil emulsion having crosslinked silicone particles in drops of silicone oil which were dispersed in water was prepared. The silicone oil drops in this emulsion had an average diameter of 8 μm, and the crosslinked silicone particles in the silicone oil drops had an average diameter of 3 μm. The emulsion was transferred to a 5 cm diameter aluminum plate, and water was removed from the emulsion by drying it in air while maintaining it in an air draft for 3 days. A creamy silicone composition consisting of a silicone oil and crosslinked silicone particles was prepared. Observation of this composition under a stereoscopic microscope showed that it consisted of rubber like crosslinked silicone particles that were uniformly dispersed in the silicone oil. The crosslinked silicone particles had a spherical shape.

Reference Example 2

A silicone oil emulsion containing crosslinked silicone particles in silicone oil drops which are dispersed in water was prepared by the same method used in Reference Example 1, with the exception that 80 parts by weight of a 10 mPa·s viscosity dimethylpolysiloxane having trimethylsiloxy groups on both molecular terminals were used instead of 80 parts by weight of the 1,000 mPa·s viscosity dimethylpolysiloxane used in Reference Example 1. Silicone oil drops contained in this emulsion had an average diameter of 7 μm, and the crosslinked silicone particles contained in the drops had an average diameter of 3 μm.

A creamy silicone composition of silicone oil and crosslinked silicone particles was prepared by removing the water from the emulsion in the same manner as Reference Example 1. Observation of the resulting composition under a stereoscopic microscope showed that it consisted of rubber like spherically shaped crosslinked silicone particles dispersed in the silicone oil.

Reference Example 3

A silicone oil emulsion was prepared by emulsifying in a colloid mill emulsifier 400 parts by weight of a 1,000 mPa·s viscosity dimethylpolysiloxane having both molecular terminals capped with trimethylsiloxy groups, 20 parts by weight of polyoxyethylene lauryl ether containing 5 mole percent polyoxyethylene, 10 parts by weight of polyoxyethylene nonylphenol ether containing 8.5 mole percent polyoxyethylene, 5 parts by weight of sodium polyoxyethylene nonylphenolether sulfonic acid containing 4 mole percent polyoxyethylene, and 565 parts by weight of water.

Reference Example 4

400 parts by weight of a 10 mPa·s viscosity dimethylpolysiloxane having both molecular terminals capped with trimethylsiloxy groups, 20 parts by weight of polyoxyethylene lauryl ether with 5 mole percent polyoxyethylene, 10 parts by weight of polyoxyethylene nonylphenol ether with 8.5 mole percent polyoxyethylene), 5 parts by weight sodium polyoxyethylene nonylphenolether sulfonic acid with 4 mole percent of polyoxyethylene, and 565 parts by weight of water, were emulsified in a colloid mill emulsifier. The product was further emulsified in a single process under a pressure of 400 kgf/m² in an homogenizer emulsifier, and a silicone oil emulsion was obtained.

Practical Example 1—Comparative Example 1

A water based fiber treatment agent (A) containing 5 percent by weight solids was prepared by adding water to the silicone oil emulsion prepared in Reference Example 1. After soaking a skein of machine sewing thread used in the preparation of 100 percent polyester spun yarn in the fiber treatment agent, and after adjusting the wet pickup to 70 percent, the product was dried for 30 minutes at 105° C. The product comprised the sewing machine thread containing 3.5 percent solids of the treatment agent adhered to the thread.

For comparison, water was added to the silicone oil emulsion of Reference Example 3 to prepare water based fiber treatment agent (B). It had a content of solids of 5 percent by weight, and it was prepared in the manner described above. This agent was then used for treating sewing machine thread. In a blank test, a skein of machine sewing thread used for preparing 100 percent polyester spun yarn was soaked in water, and after adjusting the wet pickup to 70 percent and drying the product for 30 minutes at 105° C., a sewing machine thread was prepared.

The dynamic friction coefficient ($\mu$) of these sewing machine threads was measured on a kinetic friction testing device manufactured by Daiei Kagaku Seiki Seisakusho Co., Ltd. This testing device uses samples with a length of 20 cm. The thread speed of the device can be adjusted to 1.0 m/min. and 6.0 m/min., and the drum of the testing device is made of stainless steel. The results of these measurements are shown in Table 1. As can be seen from in Table 1, the water based fiber treatment agent of the invention imparts uniformity to the movement of sewing machine threads made of a 100 percent polyester spun fiber, and it significantly decreases the dynamic friction coefficient ($\mu$) of the thread. It is therefore very suitable for lubricating sewing machine threads.

TABLE 1

| Property Example Number | Water Based Fiber Treating Agent | Dynamic Friction Coefficient ($\mu$) | | Uniformity of thread movement | General property evaluation |
| --- | --- | --- | --- | --- | --- |
| | | Thread speed @ 1 m/min | Thread speed @ 6 m/min | | |
| Pr Ex 1 | A | 0.122 | 0.134 | Uniform | Good |
| Comp Ex 1 | B | 0.235 | 0.255 | Some Not uniform | Not acceptable |
| Blank Test, only water | | 0.282 | 0.377 | Very Poor | — |

Practical Example 2—Comparative Example 2

A water based fiber treatment agent (C) was prepared using the silicone oil emulsion of Reference Example 2. This water based fiber treatment agent was used as a lubricating agent for spandex. After applying about 7.0 weight percent of the treating agent to the spandex urethane fiber thread of commercial 140D/10 filament, the thread was wound into a skein. The skein was soaked for 30 minutes in an ethanol/toluene solvent mixture containing the two fluids in a weight ratio of about 4:1. The amount of solvent mixture used to soak the skein was in a weight ratio of 100:1 based upon the weight of the solvent mixture to the weight of the thread. The raw yarn lubricating oil used to treat the skein was removed, and after drying, a treated spandex fiber thread was obtained.

As a comparison, spandex fiber thread was treated using the same method as above, except that the water based fiber treatment agent (D) that was used was an agent prepared from the silicone oil emulsion in Reference Example 4, instead of the water based fiber treatment agent (C). In a blank test, the spandex fiber thread was treated by the same method except that only water was used instead of using a water based fiber treatment agent.

These oil free spandex threads were uniformly and evenly wound onto a 50 mm long, 50 mm wide, and 2 mm thick aluminum plate while maintained under a tension of 0.1 g/D. A 500 gram load was placed onto a stack of the samples, and the stack was kept for 10 days in an oven at 80° C. After unloading the stack from the oven, the two aluminum plates were removed, and the adhesive properties of the fiber surfaces were determined. A 100 meter wound skein was also subjected to multiple stretch and recovery cycles, and then the adherence of the lubricating agent in each case was observed. These results are shown in Table 2.

As shown in Table 2, the water based fiber treatment agent of the invention decreases the adhesiveness and the tackiness of spandex fibers, improves the resistance of the fiber to multiple stretch and release cycles, and is suitable as a lubricating agent for spandex fiber.

TABLE 2

| Property Example Number | Water Based Fiber Treating Agent | Adhesiveness and Tackiness | Attachment of lubricant after multiple stretch and recovery cycles | General evaluation of property |
| --- | --- | --- | --- | --- |
| Pr Ex 2 | C | No properties observed | Both properties unchanged | Good |
| Com Ex 2 | D | Both properties slightly revealed | Both properties unchanged | Not satisfactory |
| Blank Test - only water | | Both properties significant | — | — |

Practical Example 3

Water was added to the silicone oil emulsion of Reference Example 1, and after adjusting the content of solids to 1 percent by weight, water based fiber treatment agent (E) was prepared. A 40 cm wide×40 cm long winter underwear cloth of 50% cotton and 50% polyester was vacuum cleaned three times, and the cloth was soaked for 30 seconds in fiber treatment agent (E). The wet pickup was adjusted to 80 percent using rollers, and the cloth was hing to dry overnight at room temperature. After being heated for 5 minutes at 150° C., the cloth contained 0.8 percent by weight of the treatment agent solids.

For comparison, a similar cloth was treated in the same manner but water was added to the silicone oil emulsion of Reference Example 4. The contents of solids was adjusted to 1 percent by weight. In a blank test, another similar cloth was immersed in only water and the wet pickup was adjusted to 80 percent. The cloth was hung to dry overnight at room temperature and then exposed to a temperature of 150° C. for 5 minutes.

These cloths were each cut into 5 cm×5 cm pieces, one drop of water applied to each cloth sample with a syringe, and the water absorption properties and the feel by touch were evaluated. The cloths were also tested for elongation and recovery ratio according to the knitted cloth test method of Japanese Industrial Standard JIS L 1068. These results are shown in Table 3. It can be sen in Table 3 that water based fiber treatment agents of this invention are very suitable for these purposes.

TABLE 3

| Property Example Number | Treating Agent | Feel by Touch | Water Absorptive Property, seconds | Stretch Recovery Ratio, % | General property evaluation |
| --- | --- | --- | --- | --- | --- |
| Pr Ex 3 | A | Soft Smooth & Pleasant to touch | 1.1 | 88 | Very Good |
| Comp Ex 3 | D | Not Soft & Not smooth | 1.2 | 69 | Not Good |
| Blank Test, only water | | Rough to touch, Not soft, Not smooth | 0.8 | 47 | — |

Water based fiber treatment agents of the invention impart to treated fibers improved smoothness, lubricating properties, reduced tackiness, and improved tactile sensation, and by using this method, one can impart to fibers improved smoothness, lubricating properties, reduced tackiness, and improved tactile sensation.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A method of treating fibers selected from the group consisting of raw yarns, raw cotton, stuffing, wool blends, nylon staple fibers, acrylic staple fibers, knitted fibers, spun fibers, sewing threads, spandex urethane elastic yarns, rayon fibers, regenerated fibers, acetate fibers, semi-regenerated fibers, and polyester fibers, comprising applying to the fibers a water based fiber treatment agent, the water based fiber treatment agent being a silicone oil emulsion, the silicone oil emulsion comprising:

(i) crosslinked silicone rubber particles with an average diameter of 0.01–100 μm, (ii) silicone oil drops with an average diameter of 0.05–500 μm, and (iii) water; with the provisos that (a) the crosslinked silicone rubber particles are contained within the silicone oil drops, (b) the silicone oil drops containing the crosslinked silicone rubber particles are in turn dispersed in the water, and (c) the diameter of the crosslinked silicone rubber particles is smaller than the diameter of the silicone oil drops within which the crosslinked silicone rubber particles are contained.

* * * * *